US008895914B2

(12) United States Patent
Gibson

(10) Patent No.: US 8,895,914 B2
(45) Date of Patent: Nov. 25, 2014

(54) RUGGEDIZED NEUTRON SHIELDS

(75) Inventor: Joshua Wayne Gibson, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 1065 days.

(21) Appl. No.: 12/672,445

(22) PCT Filed: Jul. 30, 2008

(86) PCT No.: PCT/US2008/071552
§ 371 (c)(1),
(2), (4) Date: Jul. 14, 2011

(87) PCT Pub. No.: WO2009/023437
PCT Pub. Date: Feb. 19, 2009

(65) Prior Publication Data
US 2011/0303836 A1    Dec. 15, 2011

Related U.S. Application Data

(60) Provisional application No. 60/955,077, filed on Aug. 10, 2007.

(51) Int. Cl.
*G01V 5/04* (2006.01)
*G01T 3/00* (2006.01)

(52) U.S. Cl.
CPC .... *G01T 3/00* (2013.01); *G01V 5/04* (2013.01)
USPC ........................................................ 250/267

(58) Field of Classification Search
CPC .......................................................... G21F 1/12
USPC .............................................. 250/267, 518.1
See application file for complete search history.

(56) References Cited

U.S. PATENT DOCUMENTS

| | | | |
|---|---|---|---|
| 3,255,353 A | 6/1966 | Scherbatskoy | |
| 3,461,291 A | 8/1969 | Goodman | |
| 3,947,683 A | 3/1976 | Schultz et al. | |
| 4,020,342 A | 4/1977 | Smith, Jr. et al. | |
| 4,078,174 A * | 3/1978 | Goldman | 376/165 |
| 4,220,851 A | 9/1980 | Whatley, Jr. | |
| 4,320,224 A | 3/1982 | Rose et al. | |
| 4,390,783 A | 6/1983 | Grau | |
| 4,492,864 A | 1/1985 | Smith, Jr. et al. | |

(Continued)

FOREIGN PATENT DOCUMENTS

| | | |
|---|---|---|
| EP | 0942147 A1 | 9/1999 |
| EP | 1158138 A2 | 11/2001 |

(Continued)

OTHER PUBLICATIONS

Decision on Grant issued in RU2010108533 on Aug. 14, 2012, 11 pages.

(Continued)

*Primary Examiner* — Constantine Hannaher
(74) *Attorney, Agent, or Firm* — Cathy Hewitt

(57) ABSTRACT

A shield for a well logging instrument includes an outer layer including a reinforcing fiber disposed in a matrix and an inner layer including a thermal neutron absorbing material disposed in a matrix. The thermal neutron absorbing material is selected to emit capture gamma rays having energy outside a selected energy range.

15 Claims, 3 Drawing Sheets

(56) References Cited

U.S. PATENT DOCUMENTS

| | | | |
|---|---|---|---|
| 4,501,964 | A | 2/1985 | Arnold |
| 4,507,554 | A | 3/1985 | Hertzog et al. |
| 4,522,868 | A * | 6/1985 | Ohuchi et al. ............... 442/200 |
| 4,596,926 | A | 6/1986 | Coope |
| 4,661,701 | A | 4/1987 | Grau |
| 4,698,501 | A | 10/1987 | Paske |
| 4,810,459 | A | 3/1989 | Fontenot |
| 4,829,176 | A | 5/1989 | Paske et al. |
| 4,873,488 | A | 10/1989 | Barber et al. |
| 4,879,463 | A | 11/1989 | Wraight et al. |
| 4,883,956 | A | 11/1989 | Melcher et al. |
| 4,904,865 | A | 2/1990 | Meisner et al. |
| 4,926,044 | A | 5/1990 | Wraight |
| 4,930,783 | A | 6/1990 | Antonious |
| 4,937,446 | A | 6/1990 | McKeon et al. |
| 4,972,082 | A | 11/1990 | Loomis et al. |
| 5,012,091 | A | 4/1991 | Moake |
| 5,021,653 | A | 6/1991 | Roscoe et al. |
| 5,049,743 | A | 9/1991 | Taylor, III et al. |
| 5,067,090 | A | 11/1991 | Seeman |
| 5,081,351 | A | 1/1992 | Roscoe et al. |
| 5,097,123 | A | 3/1992 | Grau et al. |
| 5,105,080 | A | 4/1992 | Stoller et al. |
| 5,182,051 | A | 1/1993 | Bandy et al. |
| 5,219,518 | A | 6/1993 | McKeon et al. |
| 5,235,185 | A | 8/1993 | Albats et al. |
| 5,237,594 | A | 8/1993 | Carroll |
| 5,243,190 | A | 9/1993 | Bandy et al. |
| 5,348,096 | A * | 9/1994 | Williams ..................... 166/384 |
| 5,434,408 | A | 7/1995 | Smith, Jr. et al. |
| 5,521,378 | A | 5/1996 | Roscoe et al. |
| 5,539,225 | A | 7/1996 | Loomis et al. |
| 5,608,215 | A | 3/1997 | Evans |
| 5,705,944 | A | 1/1998 | Mou et al. |
| 5,884,234 | A | 3/1999 | Jorion et al. |
| 5,929,437 | A | 7/1999 | Elliott et al. |
| 6,084,052 | A | 7/2000 | Aufdermarsh et al. |
| 6,300,762 | B1 | 10/2001 | Thomas, Jr. et al. |
| 6,373,066 | B1 | 4/2002 | Penn |
| 6,710,600 | B1 * | 3/2004 | Kopecki et al. ............... 324/338 |
| 7,023,212 | B2 | 4/2006 | Chen et al. |
| 7,026,813 | B2 | 4/2006 | Homan et al. |
| 7,073,378 | B2 | 7/2006 | Smits et al. |
| 7,148,471 | B2 | 12/2006 | Roscoe et al. |
| 2005/0028586 | A1 | 2/2005 | Smits et al. |
| 2007/0107896 | A1 | 5/2007 | Finci et al. |

FOREIGN PATENT DOCUMENTS

| | | |
|---|---|---|
| EP | 1081509 A2 | 7/2011 |
| GB | 1131406 | 4/1966 |
| GB | 1500899 | 10/1971 |
| RU | 2258944 C1 | 8/2005 |

OTHER PUBLICATIONS

Office Action issued in RU2010109533 on Jun. 4, 2012, 8 pages.

* cited by examiner

RUGGEDIZED NEUTRON SHIELDS

CROSS-REFERENCE TO RELATED APPLICATIONS

This is a national stage patent application of PCT Application No. PCT/US08/71552, filed under 35 U.S.C. §371 on 30 Jul. 2008, which claims the benefit of and priority to U.S. Provisional Application No. 60/955,077, which was filed on 10 Aug. 2007.

BACKGROUND OF THE INVENTION

1. Technical Field

This invention relates generally to apparatus for shielding against radiation and in particular to radiation shields for subsurface applications.

2. Description of Related Art

The characteristics of subsurface geological formations are of significant interest in the exploration for, production and monitoring of subsurface water, oil and gas. To that end, a variety of techniques have been developed to measure subsurface formation characteristics and evaluate the characteristics to determine petrophysical properties of interest such as fractional volume of pore space ("porosity"), the mineral composition of the subsurface formations and the fractional amount of such pore spaces that is occupied by particular connate fluids, such as oil, gas and water. These techniques typically include the subsurface deployment of tools or instruments equipped with sources adapted to emit energy into the formations (such deployment usually being through a borehole traversing the formations). The emitted energy interacts with the surrounding formations to produce various phenomena that are detected and measured by one or more sensors on the instrument. By processing the detected signal data, a profile or "log" of the subsurface formation characteristics is obtained.

A variety of measurement ("well logging") techniques have been developed to evaluate subsurface formations some of which include emitting neutrons into the formations and evaluating the results of neutron interactions with formation nuclei. Neutrons have no electric charge and their mass is similar to that of a proton. Their mass in particular makes neutrons suitable for subsurface logging applications in which hydrogen-bearing fluids are present in the subsurface formations. In the formations, neutrons interact with hydrogen nuclei in the formations by losing energy and they react with other matter in the formations in a variety of ways. The characteristics of some of these interactions can be used to determine the formation properties.

Various types of radiation sources have been used in subsurface logging systems. For example, neutrons or gamma rays may be generated simply through the use of radioactive isotopes (which naturally decay over time), an x-ray source may be used or neutrons may be generated in a device utilizing a nuclear reaction to generate neutrons on demand. U.S. Pat. Nos. 3,255,353, 4,596,926, 4,698,501, 4,705,944, 4,810,459, 4,829,176, 4,879,463, 4,904,865, and 5,012,091 describe logging instruments equipped with active radiation sources and appropriate sensors. For neutron logging, isotope sources have the advantage of being virtually indestructible. Isotope sources have no electronic parts, and so can be relied upon to always produce neutrons (zero downtime). However, this is also a disadvantage of the isotopic source. Because the emission of neutrons cannot be controlled, strict radioactive safety procedures must be followed when handling such sources, and the logging instrument containing the source after the source is installed therein. This disadvantage prompted the development of electronic neutron sources.

High-energy neutrons may be generated through the controlled collision of energized particles by using a nuclear fusion reaction in the above described sources. Such a system is commonly referred to as a neutron generator. The generation of neutrons on demand by the use of energetic particle beams allows the construction of a neutron source which emits neutrons in bursts of well-determined duration and time sequences. One such pulsed neutron generator is described in U.S. Pat. No. 3,461,291. The neutron generator described in the '291 patent uses an accelerator tube in which charged particles, such as deuterium ions, are accelerated through an electric-static potential and collide with a target element such as tritium. The reaction between the deuterium ions with the tritium target produces almost monoenergetic neutrons at an energy level of about 14 MeV. In most applications the neutrons are not emitted continuously but in short bursts of well-defined durations and in repetitive sequences. When using such a pulsed neutron generator, the formation surrounding the instrument is subjected to repeated, discrete "bursts" of neutrons. U.S. Pat. Nos. 4,501,964, 4,883,956, 4,926,044, 4,937,446, 4,972,082, 5,434,408, 5,105,080, 5,235,185, 5,539,225, and 5,608,215 describe logging instruments equipped with such on-demand neutron generators.

In practice, the borehole and surrounding formation are irradiated with neutrons, and the various interactions of the neutrons with constituent nuclei are measured. The logging instruments are equipped with one or more sensors or detectors that record numbers of neutrons, particularly epithermal energy and thermal energy, as well as gamma rays which are emitted as a result of the interaction of the neutrons with the subsurface formations and the fluids in the borehole itself. The gamma rays may include inelastic gamma rays which are a consequence of high-energy collisions of the neutrons with atomic nuclei in the earth formations, as well as capture gamma rays emitted when low energy (thermal) neutrons are captured by susceptible atomic nuclei in the formations. Various gamma ray logging techniques and tools are described, for example, in U.S. Pat. Nos. 4,390,783, 4,507,554, 5,021,653, 5,081,351, 5,097,123, 5,237,594 and 5,521,378.

Properties of the formations which may be determined as a result of measuring neutron and gamma ray phenomena include formation density, fractional volume of void or pore space in the formation (porosity), carbon/oxygen (C/O) ratios, formation lithology, and neutron capture cross section (Sigma), among other measurements. Properties which may be determined by spectral analysis of the gamma rays include concentrations of various chemical elements, for example. Properties of fluids in the wellbore may also be determined from various neutron and gamma ray measurements.

Nuclear measurements are also applied in nuclear spectroscopy techniques to obtain qualitative and quantitative information related to subsurface fluid movement. U.S. Pat. No. 5,219,518 describes an instrument equipped with a neutron source and sensors adapted to measure water flow through nuclear oxygen activation. Alternative techniques for subsurface fluid measurements include the use of radioactive markers or tracers to identify flow path between formations or wells. U.S. Pat. Nos. 5,049,743, 5,182,051, 5,243,190, and 5,929,437 describe the use of elements that can be made radioactive by bombardment with neutrons so their location can be determined by nuclear logging. Logging tools equipped with gamma ray detectors are particularly suited to distinguish and determine the location of trace materials.

The nuclear phenomena detected with these instruments are representative of interactions not only with the formation nuclei, but also with the instrument and the borehole. In order to penetrate the formation, the fast neutrons must pass through the tool housing, the fluid in the borehole and casing in some applications before entering the formation. The resulting non-formation contributions to the measured radiations significantly complicate the analysis of the formation characteristics. The problem is all the more complex since the sensitivity of the detector(s) to the radiations coming from the borehole, instrument and the formation, is a function of many parameters, such as, to name a few, lithology, porosity, tool position in the borehole, borehole size, casing size/weight/ eccentricity, cement quality, detector housings, or borehole fluid composition. Thus, it is important to take into account respective contributions of the non-formation elements.

For tools that generate and/or detect neutrons and gamma ray radiation, neutron shielding provides a means to moderate interactions of neutrons and components of both the tool itself and the immediately surrounding environment. In well logging applications, detecting gamma rays emitted from neutron interactions is particularly difficult due to the presence of the housing used to protect the gamma ray detector inside from pressure and abrasion. Neutrons interact with these housings to emit gamma rays which can be in the energy range of interest of neutrons interacting with the formations. Conventional techniques to shield against such neutron interaction include the use of shields disposed on the instrument. U.S. Pat. Nos. 3,947,683, 4,492,864, 4,220,851, 4,020,342, 4,390,783, 4,661,701, 5,081,351 and 7,148,471 describe the use of radiation shielding in well logging tools.

Neutron shielding known in the art typically includes homogeneous materials consisting of a rubber matrix with neutron absorbing (e.g., boron-10 containing) particle fillers. The filler particles are selected so as to absorb neutrons and emit capture gamma rays that are outside the energy range of gamma rays of interest resulting from neutron interaction with the formations. The rubber matrix holds the boron-10 containing particles together providing structural support. The amount (volume or mass) of such particle fillers in a homogenous shielding material is limited by the structural requirements of the shield to resist the borehole environment and to resist abrasion and mechanical damage. A need remains for improved radiation shielding structures for well logging tools.

SUMMARY OF THE INVENTION

One aspect of the invention is a shield for a well logging instrument. A shield according to this aspect of the invention includes an outer layer including a reinforcing fiber disposed in a matrix and an inner layer including a thermal neutron absorbing material disposed in a matrix. The thermal neutron absorbing material is selected to emit capture gamma rays having energy outside a selected energy range.

A well logging tool according to another aspect of the invention includes a tool mandrel configured to be moved along an interior of a wellbore drilled through subsurface formations. At least one radiation detector is disposed in an interior chamber defined by the tool mandrel. A radiation shield is disposed on an exterior surface of the tool mandrel proximate a position therein of the radiation detector. The shield includes an outer layer including a reinforcing fiber disposed in a matrix and an inner layer including a thermal neutron absorbing material disposed in a matrix. The thermal neutron absorbing material is selected to emit capture gamma rays having energy outside a selected energy range.

BRIEF DESCRIPTION OF THE DRAWINGS

Other aspects and advantages of the invention will become apparent upon reading the following detailed description and claims, and upon reference to the drawings in which like elements have been given like numerals and wherein:

DETAILED DESCRIPTION

The present invention includes improved radiation shield configurations providing desired radiation shielding and/or absorption properties while maintaining physical integrity in borehole environments. Various examples of a shield according to the invention may include layered shield material structures. With layered structures, a shield according to the invention can address the problems of proper shielding and maintaining mechanical integrity in downhole environments by including one or more outer layers for exposure to the borehole environment and one or more inner layers providing the desired shielding. The outer layers may be designed to withstand the borehole environment while protecting the one or more inner layers designed to shield neutrons from entering the tool. Some examples are also implemented with one or more structural layers in between the inner and outer layers, which can help to maintain integrity of the shield structure as a whole.

Figure 1:
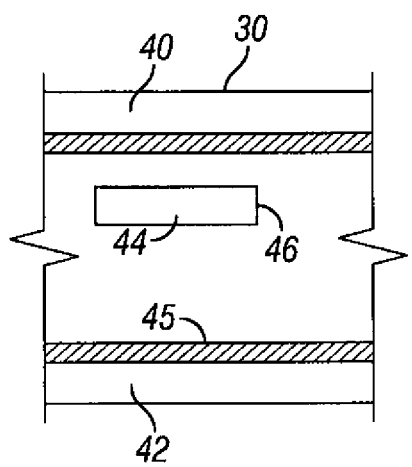
FIG. 1 is a schematic of an example shield mounted on a tool mandrel in accordance with the invention.

FIG. 1 shows a cross-sectional view of an example radiation shield 30 according to the invention. The radiation shield 30 is disposed on the exterior of an instrument housing or mandrel 45 near the position of a radiation detector 44 (e.g., a gamma ray detector). The mandrel may be made from stainless steel, titanium or other material known in the art for defining a pressure sealed, enclosed space therein. The detector 44 may be mounted within a sealed housing 46 to exclude air therefrom, and can be disposed in an interior space inside the mandrel 45. Wiring and electronic components coupled to the detector 44 also disposed inside the mandrel 45 are omitted for clarity of the illustration. The radiation shield 30 may be configured substantially as an annular cylinder having an inner layer 42 and an outer layer 40 for layering/interspersion of certain materials, as will be further explained below. The radiation shield 30 is configured to absorb or capture thermal neutrons impinging thereon, thus substantially preventing thermal neutrons from reaching the mandrel 45. By preventing the transmission of thermal neutrons to the mandrel 45, the thermal neutrons are prevented from interacting with the mandrel 45 thereby to emit gamma rays. In this way, the detector 44 is not exposed to gamma rays resulting from interaction of such neutrons with the materials used to make the mandrel 45 and the detector housing 46, as well as other materials inside the mandrel 45.

Figure 2:
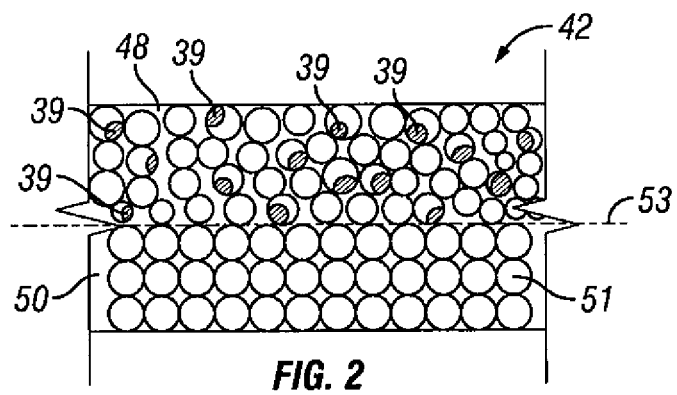
FIG. 2 is an expanded cross-section of a shield matrix in accordance with the invention.

FIG. 2 shows a cross-sectional expanded view of one side of the shield 30. An outer layering 48 may be formed of any suitable material that provides abrasion/wear resistance, does not produce gamma-rays from neutron interaction therewith in the energy range of interest with respect to formations outside a borehole, and can withstand the ambient environment in a typical borehole. Such environment can include temperatures in excess of 200 degrees C., hydrostatic pressure in excess of 1,500 bar and corrosive and/or reactive agents in a fluid typically disposed in the borehole. Suitable materials for the outer layer may include, but are not limited to, decompression-explosion resistant rubber such as nitrile rubber, polyether ketone (PEK) glass fiber, carbon fiber, a fiber sold under the trademark KEVLAR which is a registered trademark of E.I. DuPont de Nemours & Co., fglass fiber-reinforced epoxy resin, graphite or carbon fiber, thermal plastics such as PEK™, polyetheretherketone (PEEK), polyetherketoneketone (PEKK), and a plastic sold under the trademark ULTRAPEK which is a trademark of BASF, AG, Ludwigshafen, Germany, and composites of such materials. U.S. Pat. Nos. 4,320,224, 6,084,052, 4,873,488, 7,026,813, 7,023,212 and U.S. Patent Publication No. 20070107896 to Finci et al. describe downhole tools implemented with composite-based exoskeletons (all incorporated herein by reference in their entirety). In one aspect, the top or outer layering 48 is formed of a "pre-preg" (a previously manufactured fiber disposed in a plastic resin) consisting of carbon fiber embedded in PEEK. The outer layer 48 may be formed as a layered sheet or sheets and may include fiber fillers.

In one example, the outer layer 48 includes glass fiber or carbon fiber, or combinations thereof disposed in a resin matrix such as PEEK. A purpose for such structure is to provide sufficient mechanical strength and abrasion resistance to the outer layer, while minimizing the amount of hydrogen-containing material in the matrix. Such structure may minimize the thermalization of neutrons entering the outer layer from a source (see FIG. 5) and from the surrounding formations.

An inner or bottom layer 50 includes materials that provide the radiation shield 30 with substantial thermal neuron capture cross-section, and do not emit capture gamma rays that have energy in an energy range of interest intended to be detected from the formations by the radiation detector (44 in FIG. 1). The inner layer 50 can be implemented for example, by depositing crystalline boron-10 can be onto a filament, such as carbon or glass fiber, and embedding the boron-10 covered filament in an epoxy matrix, for example, PEEK. The combined structure of filament embedded in resin matrix can be premanufactured in sheets creating what is known as "pre-preg." Such pre-preg can be wound around the exterior of the mandrel (45 as shown in FIG. 1) to assemble the shield to the tool mandrel. The outer layer 48 can then be applied over the inner layer 50 to produce the completed shield 30. In some examples, the outer layer 48 may also include a selected amount of neutron-absorbing materials (e.g., boron-10 containing particles) dispersed in the resin matrix for additional shielding. Such particles are shown at 39 in FIG. 2.

Some examples, such as that shown in FIG. 2 may include a structural layer 53 disposed between the inner layer 50 and the outer layer 48. A purpose for the structural layer is to provide mechanical integrity to the overall shield structure, particularly to the inner layer 50. The structural layer 53 may be made from PEEK or similar resin, for example. A thickness of the structural layer 53 should be limited to avoid excessive thermalization of neutrons.

Figure 3:
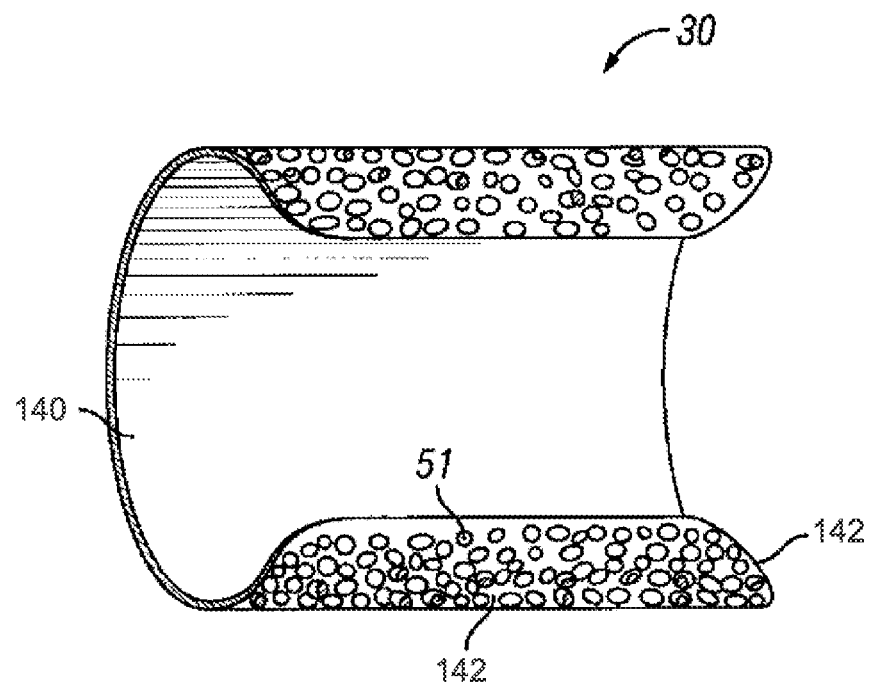
FIG. 3 is a cut-away perspective of an example shield in accordance with the invention.

FIG. 3 shows another example of a shield 30 according to of the invention. A cylindrical body 140 is shown in a cut-away perspective to illustrate the shield matrix 142. Though shown in partial view for clarity of explanation, the body 140 is formed as a single annular cylinder with elongated walls and an inner bore. The body 140 is formed using suitable materials as described above. For example, a shield 30 can be formed with a body consisting entirely of a composite material having a matrix 142 distribution as disclosed herein. The matrix 142 is configured with neutron-absorbing material or particles 51 interspersed therein and an outer layering 48 to provide abrasion resistance and wear resistance.

Figure 4:
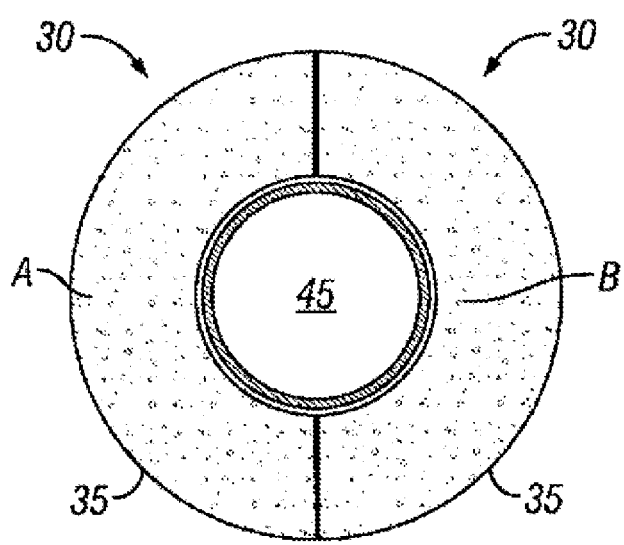
FIG. 4 is an end view of shield segments disposed on a tool mandrel in accordance with aspects of the invention.

FIG. 4 shows an end view of another example shield 30 according to the invention. Two arcuate shaped members 35 are shown disposed in juxtaposition on the outer surface of the mandrel 45. The arcuate shaped members 35 are shown in end view to illustrate how the members are "arcuate shaped.". The term arcuate shaped as used herein is intended to mean any subset of a closed cylinder and could also comprise, for example, a sector, quadrant, or semi-cylindrical device or a half cylinder. The term "arcuate shaped member" is thus intended to comprise any number of circumferential sections which, when juxtaposed together, would comprise or constitute an annular cylinder. A shield according to this example may be formed with multiple arcuate shaped members configured to form a closed cylinder (i.e., a sleeve) having an inner bore and open ends, as shown in FIG. 4.

Various implementations of the invention can be configured with a matrix 42 having neutron-absorbing material or particles 51 interspersed in a graduated manner such that a greater concentration of the material/particles are encountered deeper (i.e., in a direction away from an outer surface of the shield) in the shield body. This example is shown in FIG. 4 with the arcuate shaped member 35 labeled A. Various examples of the invention can also be configured with the neutron-absorbing material/particles 51 interspersed to form a more clearly defined layer. This example is shown in FIG. 4 with the arcuate shaped member 35 having a layer labeled B. Other examples can be configured with multiple or alternating distributions of neutron-absorbing material/particles 51 and abrasion resistant layers (as shown by the right-hand arcuate shaped member 35 in FIG. 4). Yet other examples can be configured with a distribution of neutron-absorbing material/particles 51 forming a plurality of graduated layers. This aspect is shown in the right-hand arcuate shaped member 35 of FIG. 4.

Figure 5:
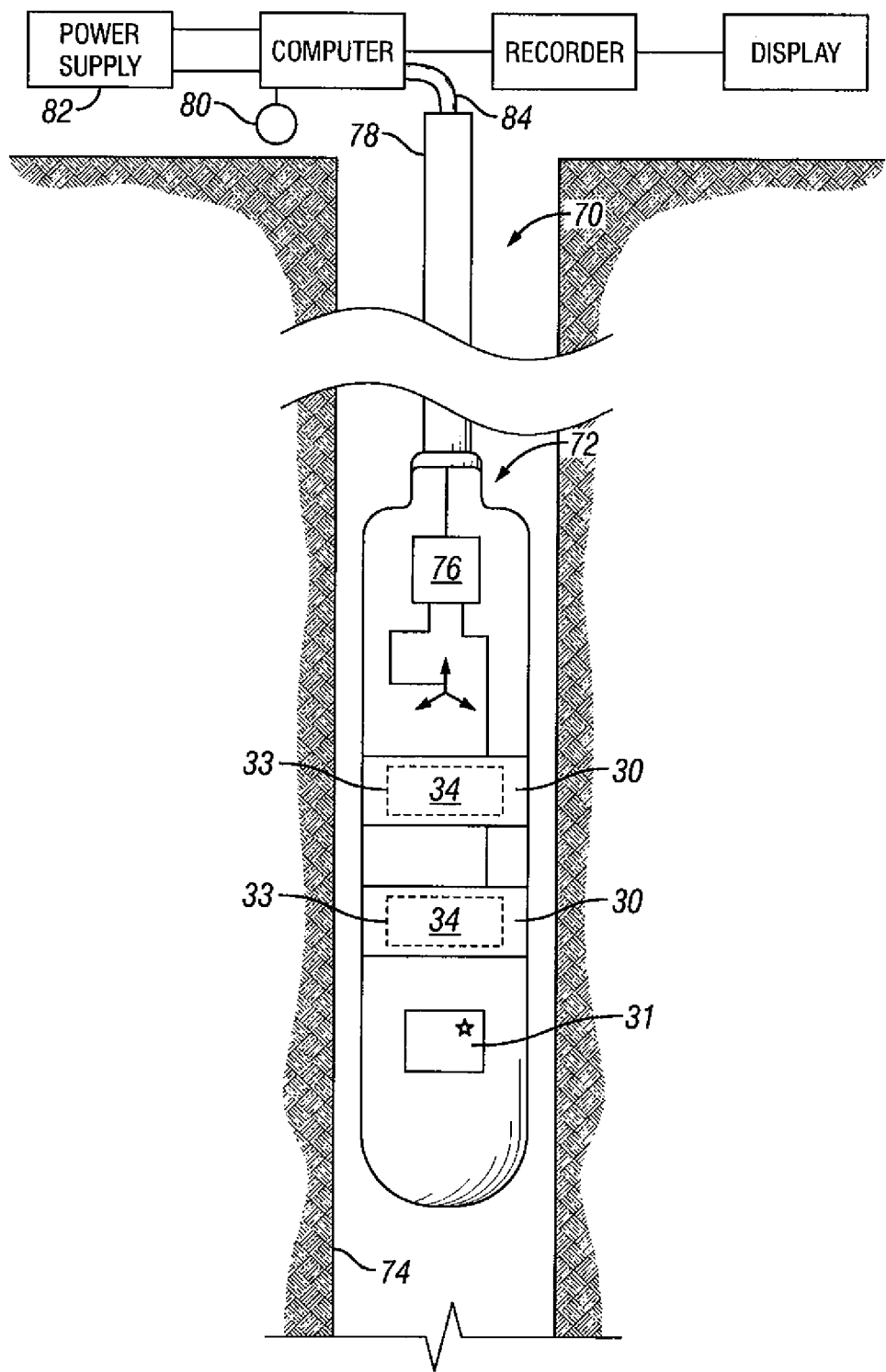
FIG. 5 is a schematic of a downhole tool equipped with shields in accordance with various aspects of the invention.

FIG. 5 shows a well logging system 70 to acquire subsurface measurement data including a plurality of shields 30 according to the invention. The well logging system 70 includes a downhole tool 72 shown disposed in a borehole 74 traversing a subterranean formation. The tool 72 might be, for example, of the type described in U.S. Pat. Nos. 7,073,378, 5,884,234, 5,067,090 and 5,608,215 (all of which are assigned to the assignee of the present invention). The tool 72 includes a radiation source 31 (e.g., a pulsed neutron generator). The shields 30 are disposed on the tool 72 body, surrounding radiation detectors 34 (e.g., gamma ray detectors) mounted within housing structures 33 disposed inside the tool body. The shields 30 may be disposed on the tool 72 by wrapping layered shielding pre-preg material under tension, by sliding a shield onto the tool body as a pre-formed sleeve structure as shown in FIG. 3, by applying cirdumferetial segments made as shown in FIG. 4 and explained with reference thereto, or by other means known in the art. The shields 30 may be held in place using any suitable means known in the art. In some examples the tool 72 body may include a recessed area or voids to accept the shield(s) 30 (not shown). Having such recesses would allow for a streamlined or smaller diameter configuration for the tool 72. The tool 72 mandrel (45 in FIG. 1) may be formed of metal or non-conductive composites as known in the art. Various examples can also be implemented with the shields 30 forming an integral part of a composite (non-metallic) tool body (not shown). In addition to the radiation source 31 and detectors 34, the tool 72 may be equipped with additional energy sources and sensors to perform a variety of subsurface measurements as known in the art. The tool 72 typically includes electronics/hardware 76 with appropriate circuitry for making and communicating or storing measurements made by the various sensors in the tool 72.

The tool 72 is shown suspended in the borehole 74 by a conveyance device 78, which can be a wireline system (e.g., slickline, armored electrical cable, and/or coiled tubing having electrical cable therein, etc.) or a pipe string in the case of a logging while-drilling system. With a wireline conveyance device, the tool 72 is raised and lowered in the borehole 74 by a winch 80, which is controlled by the surface equipment 82. The conveyance 78 includes insulated electrical conductors 84 that connect the downhole electronics 76 with the surface equipment 82 for signal/data/power and control communication. Alternatively, with drill string or slickline, the power may be supplied downhole, the signals/data may be processed and/or recorded in the tool 72 and the recorded and/or processed data transmitted by various telemetry means to the surface equipment 82. The precise forms and details of the signals produced and/or detected with the sources and detectors vary according to the desired measurements and applications as known in the art and are not limitations on the scope of the present invention.

A shield made as explained herein may be disposed on practically any device where the described radiation shielding properties are desired. Such shields are particularly suitable for subsurface applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A shield for a well logging instrument disposed in a formation, comprising:
   an outer layer including a reinforcing fiber disposed in a matrix, the reinforcing fiber comprising a carbon fiber;
   an inner layer including a thermal neutron absorbing material disposed in a matrix in a graduated manner with a greater concentration of thermal neutron absorbing material disposed in a direction away from the outer layer, the thermal neutron absorbing material selected to emit capture gamma rays having energy outside a selected energy range of gamma rays of interest resulting from neutron interaction with the formation; and
   a structural layer disposed between the inner layer and the outer layer.

2. The shield of claim 1 wherein the thermal neutron absorbing material comprises boron-10.

3. The shield of claim 1 wherein the outer layer matrix comprises at least one of nitrile rubber, polyetherketone, polyetheretherketone and polyetherketoneketone.

4. The shield of claim 1 wherein the thermal neutron absorbing material comprises neutron absorbing particles deposited on a fiber, the deposited fiber disposed in a matrix.

5. The shield of claim 4 wherein the deposited fiber comprises at least one of glass fiber and carbon fiber.

6. The shield of claim 1 wherein the structural layer comprises polyetheretherketone.

7. The shield of claim 1 wherein the inner layer and the outer layer are configured as annular cylinders.

8. The shield of claim 7 wherein the annular cylinders are disposed on an exterior surface of a tool mandrel, the tool mandrel having a radiation detector therein.

9. A well logging tool, comprising:
   a tool mandrel configured to be moved along an interior of a wellbore drilled through subsurface formations;
   at least one radiation detector disposed in an interior chamber defined by the tool mandrel;
   a radiation shield disposed on an exterior surface of the tool mandrel proximate a position therein of the radiation detector, the shield including an outer layer including a reinforcing fiber, comprising a carbon fiber, disposed in a matrix, and an inner layer including a thermal neutron absorbing material disposed in a matrix in a graduated manner with a greater concentration of thermal neutron absorbing material disposed in a direction away from the outer layer, the thermal neutron absorbing material selected to emit capture gamma rays having energy outside an energy range of gamma rays of interest resulting from neutron interaction with the subsurface formations, and a structural layer disposed between the inner layer and the outer layer.

10. The tool of claim 9 wherein the thermal neutron absorbing material comprises boron-10.

11. The tool of claim 9 wherein the outer layer matrix comprises at least one of nitrile rubber, polyetherketone, polyetheretherketone and polyetherketoneketone.

12. The tool of claim 9 wherein the thermal neutron absorbing material comprises neutron absorbing particles deposited on a fiber, the deposited fiber disposed in a matrix.

13. The tool of claim 12 wherein the deposited fiber comprises at least one of glass fiber and carbon fiber.

14. The tool of claim 9 wherein the structural layer comprises polyetheretherketone.

15. The tool of claim 9 wherein the inner layer and the outer layer are configured as annular cylinders.

* * * * *